(12) United States Patent
Lendenmann et al.

(10) Patent No.: US 11,705,274 B2
(45) Date of Patent: Jul. 18, 2023

(54) ARRANGEMENT FOR OVERVOLTAGE PROTECTION OF SUBSEA ELECTRICAL APPARATUS

(71) Applicant: ABB Schweiz AG, Baden (CH)

(72) Inventors: Heinz Lendenmann, Västerås (SE); Kim Missing, Vaasa (FI); Esa Virtanen, Vaasa (FI); Thomas Wagner, Mägenwil (CH)

(73) Assignee: ABB Schweiz AG, Baden (CH)

( * ) Notice: Subject to any disclaimer, the term of this patent is extended or adjusted under 35 U.S.C. 154(b) by 21 days.

(21) Appl. No.: 17/356,669

(22) Filed: Jun. 24, 2021

(65) Prior Publication Data

US 2021/0407730 A1  Dec. 30, 2021

(30) Foreign Application Priority Data

Jun. 30, 2020 (EP) .................................. 20183053

(51) Int. Cl.
*H01F 27/34* (2006.01)
*H02B 11/26* (2006.01)
(Continued)

(52) U.S. Cl.
CPC .......... *H01F 27/343* (2013.01); *H01F 27/34* (2013.01); *H02B 11/26* (2013.01); *H02H 9/005* (2013.01); *H02H 9/08* (2013.01)

(58) Field of Classification Search
CPC ... H01C 7/10; H01C 7/12; H02H 9/04; H02H 9/06; H02H 9/08; H02H 9/005;
(Continued)

(56) References Cited

U.S. PATENT DOCUMENTS

| 4,679,113 A | 7/1987 | Book et al. |
| 2012/0218672 A1* | 8/2012 | Nunes ..................... H02M 1/32 361/91.1 |

(Continued)

FOREIGN PATENT DOCUMENTS

| EP | 3561985 A1 | 10/2019 |
| GB | 2114388 A | 8/1983 |
| JP | 2003088135 A | 3/2003 |

OTHER PUBLICATIONS

Extended European Search Report; Application No. 20183053.6; Completed: Dec. 4, 2020; dated Dec. 14, 2020; 3 Pages.

*Primary Examiner* — Danny Nguyen
(74) *Attorney, Agent, or Firm* — Whitmyer IP Group LLC

(57) ABSTRACT

An arrangement for an overvoltage protection of a subsea electrical apparatus and a method for operating it. The arrangement includes a tank submersible below a water surface level, an electrical apparatus accommodated in the tank, and a surge arrester arrangement accommodated in the tank and coupled to a power supply of the electrical apparatus in the tank for providing the overvoltage protection of the electrical apparatus. The arrangement further includes a controllable grounding switch for connecting the surge arrester arrangement to a ground point in response to a control of the grounding switch to a closed state and for disconnecting the surge arrester arrangement from the ground point in response to a control of the grounding switch to an open state.

17 Claims, 4 Drawing Sheets

(51) Int. Cl.
*H02H 9/00* (2006.01)
*H02H 9/08* (2006.01)

(58) Field of Classification Search
CPC . H02H 9/043; H02H 3/20; H02H 7/04; H01F 27/343; H01F 27/34
USPC .......................................... 361/35, 117–120
See application file for complete search history.

(56) References Cited

U.S. PATENT DOCUMENTS

| | | |
|---|---|---|
| 2016/0149396 A1 | 5/2016 | Lindell et al. |
| 2016/0247618 A1 | 8/2016 | Diesen |
| 2016/0380423 A1* | 12/2016 | Gunnar .................... H02G 9/02 361/88 |

* cited by examiner

ARRANGEMENT FOR OVERVOLTAGE PROTECTION OF SUBSEA ELECTRICAL APPARATUS

TECHNICAL FIELD

The invention relates to an arrangement for overvoltage protection of a subsea electrical apparatus and a method for operating the arrangement.

BACKGROUND

In power distribution applications, especially subsea applications are used in very demanding operating environment when considering a commissioning and operation thereof. Due to the subsea environment a substantially continuous access of a person or of a vessel capable to operate underwater to the submerged electrical apparatus is typically impossible. Especially troublesome this is during commissioning tests, i.e. start-up tests, factory acceptance tests or qualification approval tests of the electrical apparatus, if the tests must be carried out in a real operating environment and with a large number of different operating states of the electrical apparatus or some additional equipment relating thereto.

The start-up test or the factory acceptance test of a subsea transformer are, for example, examples of the tests which belong to a group of tests that must be carried out at different operating states of the electrical apparatus or of some additional equipment relating thereto, in case of the subsea transformer especially at different operating states of an overvoltage protection of the transformer. For carrying out this kind of tests it is in practice necessary to lift the submerged electrical apparatus with possible additional equipment relating thereto above a water surface level and to lower it/them back into the water after necessary configurations have been made for the next test. This may take place several times before the complete testing procedure has been carried out and the apparatus is ready for the start-up. This is very time consuming especially in deep water, wherein the actual operating place of the electrical apparatus may be even several kilometres below the water surface level.

SUMMARY

An object of the present invention is to provide a novel arrangement for a subsea overvoltage protection of an electrical apparatus and a method for operating the arrangement.

The invention is characterized by the features of the independent claims.

The invention is based on the idea of providing an overvoltage protection of a subsea electrical apparatus with a surge arrester arrangement coupled to a power supply of the electrical apparatus and a controllable grounding switch for connecting the surge arrester arrangement to a ground point in response to a control of the grounding switch to a closed state and for disconnecting the surge arrester arrangement from the ground point in response to a control of the grounding switch to an open state.

The solution disclosed provides an effective and easy way to carry out a change in an operating state of the overvoltage protection in subsea applications, and especially during carrying out test procedures, such as factory acceptance tests, of the electrical apparatus during which the operating state of the overvoltage protection should be varied for carrying out a complete test procedure.

Some embodiments of the invention are disclosed in the dependent claims.

BRIEF DESCRIPTION OF THE DRAWINGS

In the following the invention will be described in greater detail by means of preferred embodiments with reference to the accompanying drawings, in which.

For the sake of clarity, the figures show some embodiments of the invention in a simplified manner. Like reference numerals identify like elements in the Figures.

DETAILED DESCRIPTION

Figure 1:
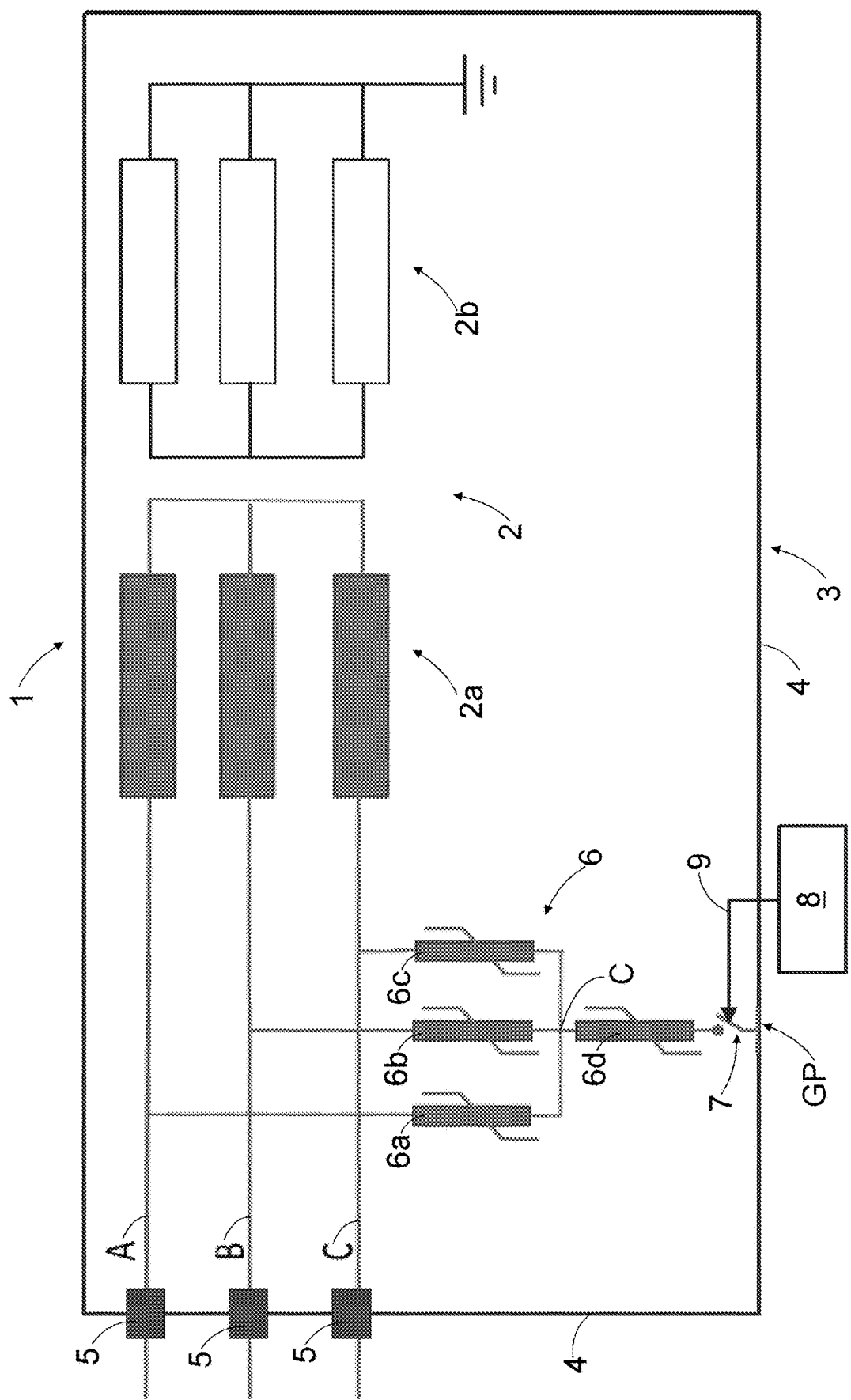
FIG. 1 shows schematically in cross-section an arrangement for an overvoltage protection of a subsea electrical apparatus in one operating state of the overvoltage protection.
Figure 2:
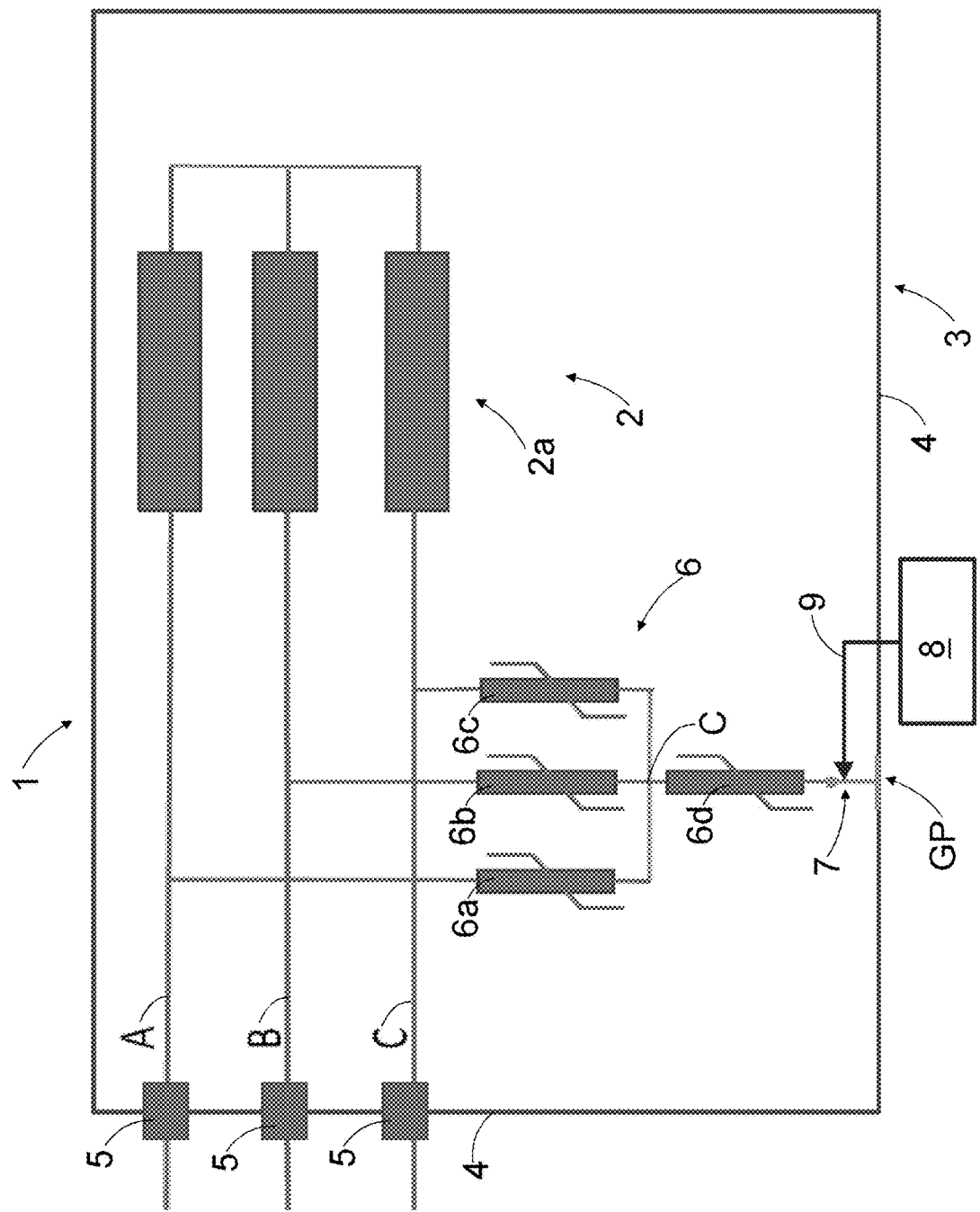
FIG. 2 shows schematically in cross-section the arrangement of FIG. 1 in another operating state of the overvoltage protection.

FIG. 1 shows schematically in cross-section an arrangement 1 for an overvoltage protection of a subsea electrical apparatus in one operating state of the overvoltage protection. FIG. 2 shows schematically in cross-section the arrangement 1 of FIG. 1 in another operating state of the overvoltage protection.

The arrangement of FIGS. 1 and 2 comprises a subsea transformer 2 having a primary winding 2a and a secondary winding 2b and intended to convert a voltage on an input of the transformer 2, i.e. the voltage on the primary winding 2a, to another voltage on an output of the transformer 2, i.e. to another voltage on the secondary winding 2b. In the embodiment shown in the figures output leads of the transformer 2 secondary winding 2b are grounded, that however, not being essential in respect of the solution disclosed herein. In FIG. 2 the secondary winding 2b is omitted.

In the embodiment of the figures the transformer 2 provides a kind of an electrical apparatus that may form a part of the arrangement disclosed herein. Instead of the transformer 2, the electrical apparatus forming part of the arrangement may for example be a frequency converter or some other instrumentation.

The arrangement further comprises a tank 3, walls or outer walls of the tank 3 denoted generally with the reference sign 4. The walls 4 of the tank 3 are made of steel, or some other applicable material, that allows the tank 3 to be submerged below a water surface level such that the structure of the tank 3 is tight-proof, may be grounded and is pressure-proof enough to resist high pressures prevailing even several kilometres below the water surface level. The walls 4 of the tank 3 define an internal space or volume of the tank 3 wherein the transformer 2 may be accommodated. Power conductors, i.e. phase conductors A, B and C connected to the primary winding 2b of the transformer 2 for supplying power to the transformer 2 are arranged to penetrate the wall structure of the tank 3 through respective bushings 5. The phase conductors A, b or C may be implemented by wires, cables or busbars, for example. The internal free space of the tank 3 may be filled with an electrical insulating and heat conducting fluid, such as vegetable-based oil.

The arrangement disclosed comprises also a surge arrester arrangement 6 accommodated in the tank 3 and coupled to the power supply, i.e. to the phase conductors A, B, C, of the transformer 2 in the tank 3 for proving an overvoltage protection of the transformer 2. The surge arresters are protective devices that may be connected in parallel with electrical equipment to be protected so as to shunt or divert overvoltage induced current surges safely around the electrical equipment, herein the transformer 2, and thereby protect the electrical equipment and its internal circuitry from damage. Implementations of different kind of surge arresters are generally known for a person skilled in the art and are therefore not disclosed herein in more detail.

The arrangement 1 disclosed also comprises in the tank 3 a controllable grounding switch 7 for connecting the surge arrester arrangement 6 to a ground point GP or ground potential GP in response to a control of the grounding switch 7 to a closed state and for disconnecting the surge arrester arrangement 6 from the ground point GP or from the ground potential GP in response to a control of the grounding switch 7 to an open state. The ground point GP thus forms in the arrangement 1 a point that is grounded or earthed, providing a ground potential or earth potential in the system. FIG. 1 shows the grounding switch 7 in the open state, whereby the surge arrester arrangement 6 is disconnected from the ground point GP, and FIG. 2 shows the grounding switch 7 in a closed state, whereby the surge arrester arrangement 6 is connected to the ground point GP. During normal operation of the arrangement 1 the surge arrester arrangement 6 is connected to the ground point GP. Herein the ground point GP is arranged at the wall 4 of the tank 3.

The controllable grounding switch 7 in the tank 3 makes it easy to control the state of the surge arrester arrangement 6, i.e. whether the surge arrester arrangement 6 is connected or not connected to the ground potential. This is especially important during start-up tests or factory acceptance tests or qualification approval tests of the transformer 2, wherein the grounding switch must be controlled to the open state for high voltage amplifying current tests or AC tests but to the closed state for at least one test other than the high voltage AC test, such as an impulse test of the transformer 2.

Previously the submerged tank 3 with the transformer 2 and the surge arrester arrangement 6 had to be lifted above the water surface level for changing the state of the grounding of the surge arrester arrangement 6 and thereafter to lower the tank 3 with the transformer 2 and the surge arrester arrangement 6 back into the water for carrying out the complete test procedure, or alternatively, skip some parts of the tests. With the solution disclosed herein the testing procedure may be accelerated by avoiding the lifting and lowering of the tank 3 back and forth. The tank 3 may also be installed from the beginning at its final subsea position if the transformer 2 in question is intended to be introduced immediately after carrying out the test procedure.

For protecting the transformer 2 during the normal operation thereof, the grounding switch 7 is controlled to the closed state after the test procedure. Additionally, if the surge arrester arrangement 6 will fail at some point, the surge arrester arrangement 6 may be controlled to the open state for disconnecting the surge arrester arrangement 6 from the ground point GP, i.e. for arranging the surge arrester arrangement 6 to float, so to speak, and thereby allowing the electrical apparatus to continue the operation thereof, although without active overvoltage protection.

The state of the controllable grounding switch 7 may be controlled remotely by a control unit 8 external to the tank 3, whereby the control unit 8 may be located at a control centre located either offshore or ashore. A control signal line 9 between the grounding switch 7 and the control unit 8 may penetrate the wall structure of the tank 3 through a respective bushing.

In the embodiment of FIGS. 1 and 2, as well as later in the embodiment of FIGS. 3 and 4, the surge arrester arrangement 6 comprises four surge arresters 6a, 6b, 6c, 6d. Each of the three surge arresters 6a, 6b, 6c is coupled to the respective phase conductor A, B, C at the power supply of the transformer 2. Furthermore, these three surge arresters 6a, 6b, 6c, i.e. the first surge arrester 6a connected to the phase conductor A, the second surge arrester 6b connected to the phase conductor B and the third surge arrester 6c connected to the phase conductor C are connected in a star connection at a common point C thereof. The fourth surge arrested 6d, in turn, is connected to the common point C for connecting the common point C to the ground point GP by the fourth surge arrester 6d and by the controllable grounding switch 7 arranged between the fourth surge arrester 6d and the ground point GP. The surge arrester arrangement 6 disclosed herein is called a Neptune connection. However, other surge arrester arrangements, depending on the electrical apparatus in question, are also possible.

Figure 3:
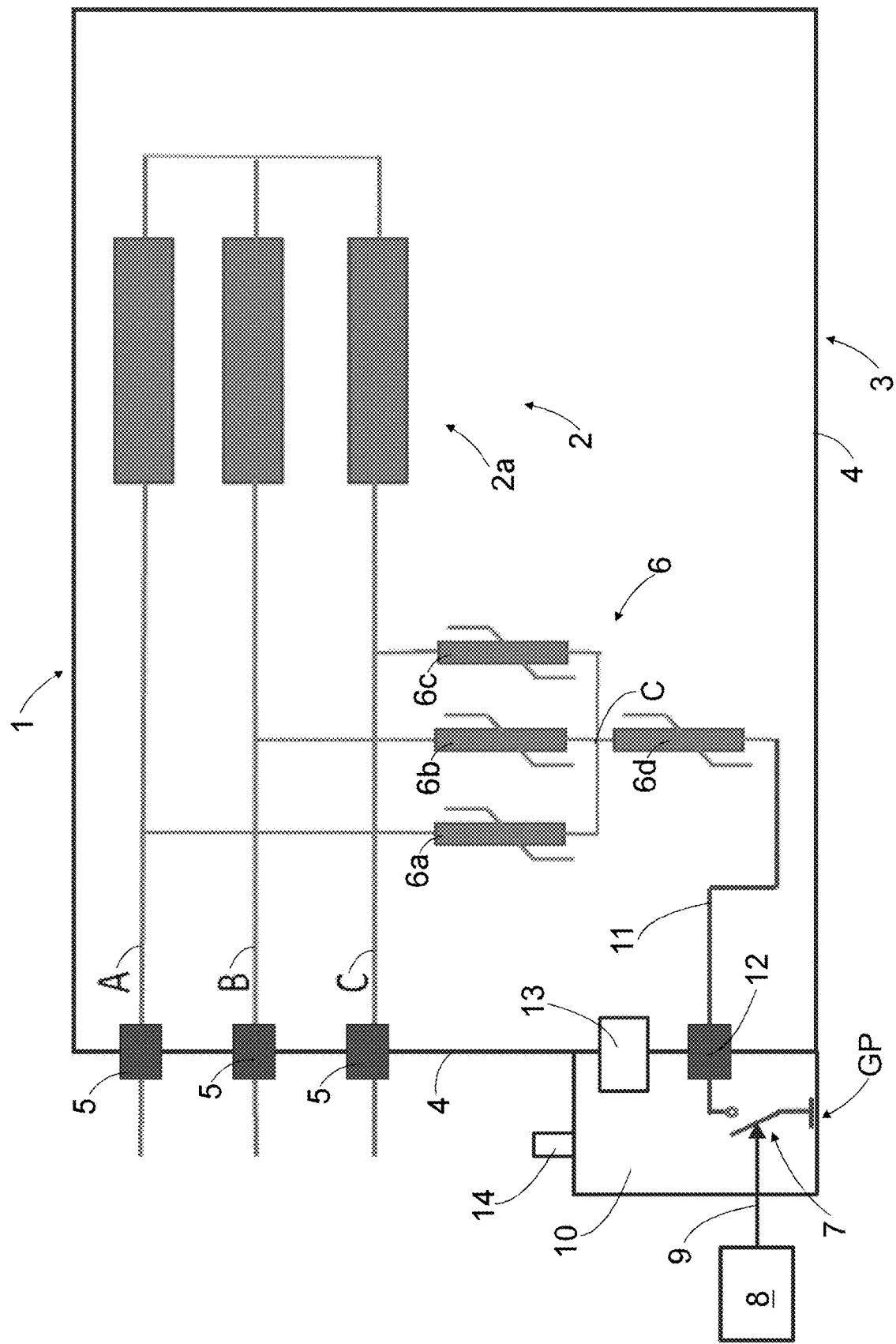
FIG. 3 shows schematically in cross-section another arrangement for an overvoltage protection of the subsea electrical apparatus in one operating state of the overvoltage protection.

FIG. 3 shows schematically in cross-section another arrangement 1 for an overvoltage protection of a subsea electrical apparatus in one operating state of the overvoltage protection. FIG. 4 shows schematically in cross-section the arrangement 1 of FIG. 3 in another operating state of the overvoltage protection. The electrical apparatus in the arrangement of FIGS. 3 and 4 is again the subsea transformer 2 as disclosed above, the secondary winding 2b of the transformer 2 being omitted in FIGS. 3 and 4. Further, in the arrangement of FIGS. 3 and 4 the overvoltage protection of the transformer 2 is provided by the surge arrester arrangement 6 and the controllable grounding switch 7 as disclosed above, FIG. 3 showing the grounding switch 7 in the open state and FIG. 4 showing the grounding switch 7 in the closed state. In the embodiment of FIGS. 1 and 2 the controllable grounding switch 7 is inside the tank 3, whereas in the embodiment of FIGS. 3 and 4 the controllable grounding switch 7 is outside the tank 3.

Figure 4:
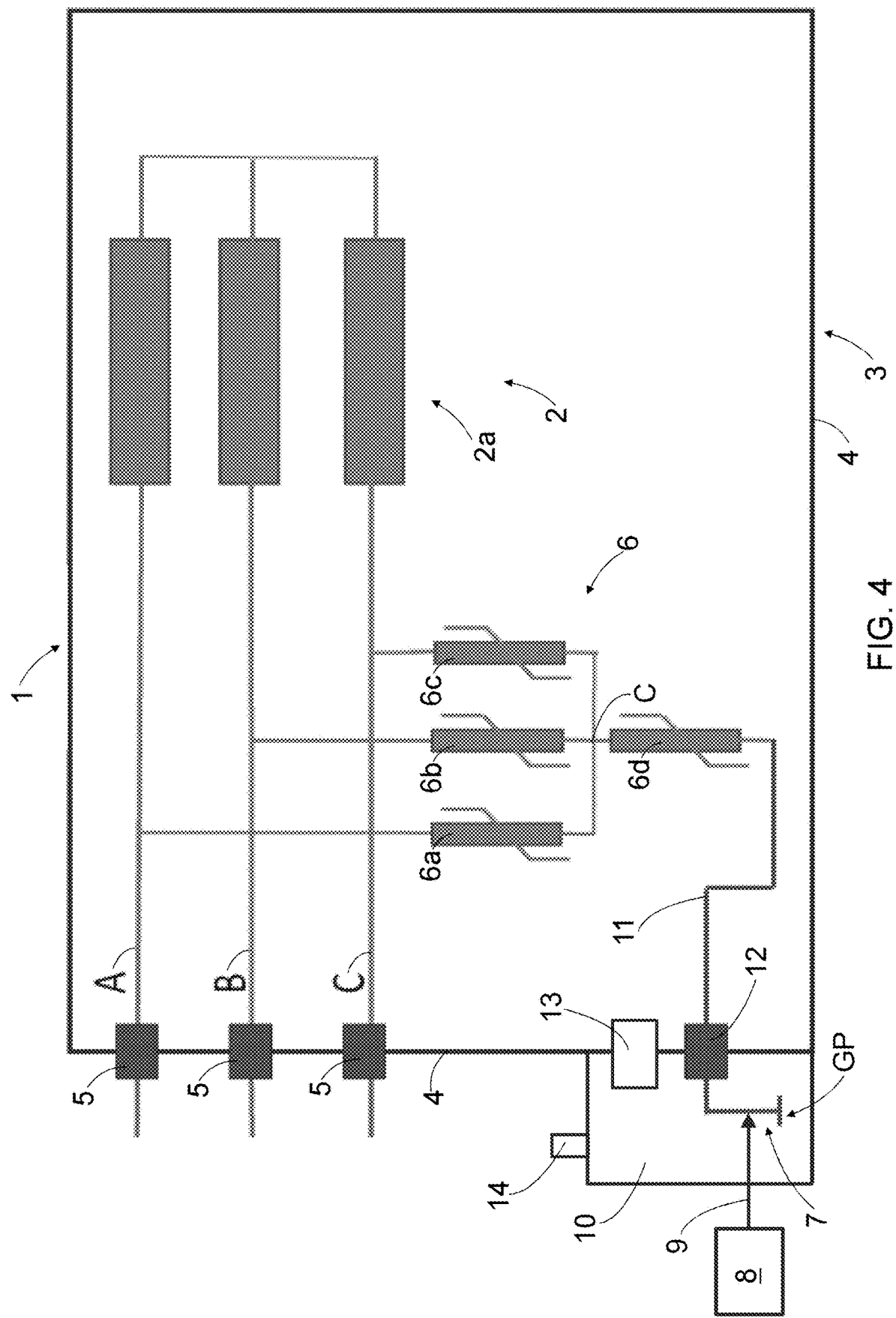
FIG. 4 shows schematically in cross-section the arrangement of FIG. 3 in another operating state of the overvoltage protection.

In the embodiment of FIGS. 3 and 4, the ground point GP as well the controllable grounding switch 7 are arranged outside the tank 3. The arrangement 1 of FIGS. 3 and 4 comprises a chamber 10 that is arranged outside the tank 3 and attached to a wall 4 of the tank 3. The chamber 10 is also preferably made of steel, whereby the chamber 3 may be welded to the wall 4 of the tank 3 to provide tight-proof and pressure-proof structure that may be grounded. The grounding switch 7 is arranged inside the chamber 10. The operation of the grounding switch 7 is controlled by the control unit 8 as disclosed above.

The grounding switch 7 is connected to the surge arrester arrangement 6, and to be more exact, to the fourth surge arrester 6d by a grounding conductor 11, that may be implemented by a wire, a cable or a busbar, for example. The grounding conductor 11 is arranged to penetrate the wall structure of the tank 3 at the chamber 10 through a respective bushing 12.

The arrangement 1 of FIGS. 3 and 4 comprises further a pressure sensitive valve 13 arranged at the wall 4 of the tank 3 at the chamber 10. The pressure sensitive valve 13 is one embodiment of closing means for providing a closable connection between an interior of the tank 3 and an interior of the chamber 10. The chamber 13 may comprise an openable aggregate 14 having an implementation through which the interior of the chamber 10 may be vacuum treated and/or to be filled with the insulating fluid but still providing a double barrier closing the chamber 10 against outer air when not submerged into the water and against water when submerged into the water.

The pressure sensitive valve 13, or instead of that some other closing means, may be opened when the tank 3 and the electrical apparatus and the surge arrester arrangement therein is started to be submerged into the water, whereby the bushing 12 of the grounding conductor 11, or some other means arranged to provide the penetration of the grounding conductor 11 through the wall 4 of the tank 3, does not need to withstand the high pressure resulting from the submerging. When the pressure sensitive valve 13 is used as the closing means, the closing means will be automatically opened in response to pressure difference over the valve exceeding the defined or set pressure, which should be higher than the pressure difference taking place over the bushing 12 during the test procedures but smaller than a maximum allowed pressure difference over the bushing 12.

In the examples disclosed above the subsea transformer 2 was the electrical apparatus under interest but, as already shortly mentioned above, the solution disclosed herein may also be utilized in applications of frequency converters or some other suitable instrumentation instead of subsea transformers 2.

It will be obvious to a person skilled in the art that, as the technology advances, the inventive concept can be implemented in various ways. The invention and its embodiments are not limited to the examples described above but may vary within the scope of the claims.

The invention claimed is:

1. An arrangement for an overvoltage protection of a subsea electrical apparatus, the arrangement comprising:
    a tank submersible below a water surface level,
    an electrical apparatus accommodated in the tank,
    a surge arrester arrangement accommodated in the tank and coupled to a power supply of the electrical apparatus in the tank for providing the overvoltage protection of the electrical apparatus, and
    a controllable grounding switch for connecting the surge arrester arrangement to a ground point in response to a control of the grounding switch to a closed state and for disconnecting the surge arrester arrangement from the ground point in response to a control of the grounding switch to an open state,
    wherein the arrangement comprises a control unit external to the tank and configured to control the state of the grounding switch remotely.

2. The arrangement as claimed in claim 1, wherein the grounding switch is accommodated in the tank.

3. The arrangement as claimed in claim 1, wherein the grounding switch is arranged outside the tank and accommodated in a chamber attached to a wall of the tank outside the tank.

4. The arrangement as claimed in claim 3, wherein the arrangement comprises a grounding conductor arranged between the surge arrester arrangement and the grounding switch, the grounding conductor arranged to penetrate the wall of the tank at the chamber.

5. The arrangement as claimed in claim 3, wherein the arrangement comprises a closable connection between an interior of the chamber and an interior of the tank through the wall of the tank at the chamber to provide the connection between the interior of the chamber and the interior of the tank.

6. The arrangement as claimed in claim 5, wherein the arrangement comprises a pressure sensitive valve arranged at the wall of the tank at the chamber to provide the closable connection between the interior of the chamber and the interior of the tank.

7. The arrangement as claimed in claim 1, wherein the surge arrester arrangement comprises four surge arresters, three of the four surge arresters each coupled to a respective phase conductor at the power supply of the electrical apparatus and connected in a star connection at a common point thereof, the fourth surge arrested being connected to the common point for connecting the common point to the ground point by the fourth surge arrester and the controllable grounding switch arranged between the fourth surge arrester and the ground point.

8. The arrangement as claimed in claim 1, wherein the electrical apparatus is a subsea transformer.

9. A method for operating an arrangement including:
    a tank submersible below a water surface level,
    an electrical apparatus accommodated in the tank,
    a surge arrester arrangement accommodated in the tank and coupled to a power supply of the electrical apparatus in the tank for providing the overvoltage protection of the electrical apparatus, and
    a controllable grounding switch for connecting the surge arrester arrangement to a ground point in response to a control of the grounding switch to a closed state and for disconnecting the surge arrester arrangement from the ground point in response to a control of the grounding switch to an open state;
    wherein the method comprises controlling the grounding switch remotely for connecting the surge arrester arrangement to the ground point by controlling the grounding switch to the closed state and for disconnecting the surge arrester arrangement from the ground point by controlling the grounding switch to the open state; and
    wherein the arrangement comprises a control unit external to the tank and configured to control the state of the grounding switch remotely.

10. The method as claimed in claim 9, wherein the electrical apparatus is a subsea transformer and the grounding switch is controlled to the open state for high voltage AC tests of the transformer.

11. The method as claimed in claim 9, wherein the electrical apparatus is a subsea transformer and the grounding switch is controlled to the closed state for tests for at least one test other than high voltage AC test of the transformer.

12. The method as claimed in claim 9, wherein the grounding switch is controlled to the closed state for protecting the electrical apparatus against overvoltage during the operation of the electrical apparatus.

13. The arrangement as claimed in claim 4, wherein:
    the arrangement comprises a closable connection between an interior of the chamber and an interior of the tank through the wall of the tank at the chamber to provide the connection between the interior of the chamber and the interior of the tank.

14. The arrangement as claimed in claim 13, wherein:
    the arrangement comprises a pressure sensitive valve arranged at the wall of the tank at the chamber to provide the closable connection between the interior of the chamber and the interior of the tank.

15. The arrangement as claimed in claim 4, wherein the arrangement comprises a closable connection between an interior of the chamber and an interior of the tank through the wall of the tank at the chamber to provide the connection between the interior of the chamber and the interior of the tank.

16. The arrangement as claimed in claim 2, wherein the surge arrester arrangement comprises four surge arresters, three of the four surge arresters each coupled to a respective phase conductor at the power supply of the electrical apparatus and connected in a star connection at a common point thereof, the fourth surge arrested being connected to the common point for connecting the common point to the ground point by the fourth surge arrester and the controllable grounding switch arranged between the fourth surge arrester and the ground point.

17. The arrangement as claimed in claim 2, wherein the electrical apparatus is a subsea transformer.

\* \* \* \* \*